United States Patent
Li et al.

(10) Patent No.: US 11,411,260 B2
(45) Date of Patent: Aug. 9, 2022

(54) LITHIUM-ION CELL CONTAINING SOLID ADSORBENT AND METHOD OF PRODUCING THE SAME

(71) Applicant: FORD GLOBAL TECHNOLOGIES, LLC, Dearborn, MI (US)

(72) Inventors: Feng Li, Troy, MI (US); Andrew Tipton, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 16/661,455

(22) Filed: Oct. 23, 2019

(65) Prior Publication Data

US 2021/0126298 A1 Apr. 29, 2021

(51) Int. Cl.
*H01M 10/52* (2006.01)
*H01M 10/058* (2010.01)
*H01M 10/0525* (2010.01)

(52) U.S. Cl.
CPC ......... *H01M 10/52* (2013.01); *H01M 10/058* (2013.01); *H01M 10/0525* (2013.01); *H01M 2220/20* (2013.01)

(58) Field of Classification Search
CPC . H01M 10/52; H01M 10/0525; H01M 10/058
USPC .................................................. 429/57, 163
See application file for complete search history.

(56) References Cited

U.S. PATENT DOCUMENTS

| | | | |
|---|---|---|---|
| 6,461,757 B1 * | 10/2002 | Sasayama | H01M 50/172 429/59 |
| 6,632,565 B2 | 10/2003 | Nemoto | |
| 7,776,465 B1 * | 8/2010 | Hatazawa | H01M 50/116 429/57 |
| 9,023,204 B2 | 5/2015 | Shimada et al. | |
| 9,172,072 B2 | 10/2015 | Shibata et al. | |
| 9,517,445 B2 | 12/2016 | Romanos et al. | |
| 2003/0049519 A1 * | 3/2003 | Ishida | H01M 10/0587 429/57 |
| 2013/0130079 A1 * | 5/2013 | Kako | H01M 50/636 429/82 |

(Continued)

FOREIGN PATENT DOCUMENTS

| | | |
|---|---|---|
| JP | H07262999 A | 10/1995 |
| WO | 2019/097739 A1 | 5/2019 |

OTHER PUBLICATIONS

Cavenati, S. et al., "Adsorption Equilibrium of Methane, Carbon Dioxide, and Nitrogen on Zeolite 13X at High Pressure," J. Chem. Eng. Data 2004, 49, pp. 1095-1101.

(Continued)

*Primary Examiner* — Sean P Cullen
(74) *Attorney, Agent, or Firm* — David B. Kelley; Brooks Kushman P.C.

(57) ABSTRACT

According to one or more embodiments, a method of producing a lithium-ion cell includes constructing a cell defining a cavity housing an electrode assembly including a cathode, an anode, a separator, and an electrolyte, forming the cell to generate formation gas in the cavity, and releasing the formation gas from the cavity. The method further includes placing a solid adsorbent in the cavity adjacent the electrode assembly after the releasing, and sealing the cavity with the solid adsorbent therein such that post-formation gas is adsorbed by the solid adsorbent in the cavity.

12 Claims, 4 Drawing Sheets

(56) References Cited

U.S. PATENT DOCUMENTS

| | | | |
|---|---|---|---|
| 2013/0171483 A1* | 7/2013 | Shibata | H01M 50/30 429/56 |
| 2013/0236749 A1* | 9/2013 | Woo | H01M 50/578 429/56 |
| 2013/0244093 A1* | 9/2013 | Min | H01M 50/14 429/185 |
| 2014/0186663 A1* | 7/2014 | Hiroki | H01M 10/0525 429/57 |
| 2015/0125721 A1 | 5/2015 | Yoon | |
| 2016/0181599 A1* | 6/2016 | Hwang | H01M 4/505 429/219 |
| 2017/0005368 A1* | 1/2017 | Mitsuhashi | H01M 4/13 |
| 2017/0018822 A1 | 1/2017 | Nozue | |
| 2018/0261882 A1 | 9/2018 | Chang et al. | |

OTHER PUBLICATIONS

Kim, J. et al., "New materials for methane capture from dilute and medium-concentration sources," Nature Communications, 4:1694, 2013, pp. 1-7.

Tian, T. et al., "A sol-gel monolithic metal-organic framework with enhanced methane uptake," Nature Materials, Advance Online Publication, 2017, pp. 1-7.

* cited by examiner

LITHIUM-ION CELL CONTAINING SOLID ADSORBENT AND METHOD OF PRODUCING THE SAME

TECHNICAL FIELD

The present application is directed to a lithium ion cell, and more particularly, a lithium ion cell including a solid adsorbent for gas removal.

BACKGROUND

Electric vehicles (e.g., hybrids, plug-in hybrids, and fully electric vehicles) are one of the transportation sector's solutions to meeting future increased fuel economy standards. Electric vehicles depend on batteries, such as lithium-ion (Li-ion) batteries, to supply some or all of the vehicle's traction electrical loads. Manufacturers package lithium-ion cells in metal cans or metalized plastic (pouch cells). During use and storage, side reactions may produce gases such as hydrogen, methane, ethane, ethene, propene, carbon dioxide, carbon monoxide, or combinations thereof, which may increase the internal cell pressure and cause the cell to bulge or swell.

Increases in internal pressure can result in performance degradation whether the cell is in the compressed state or the non-compressed state. Swelling is most often visible in pouch cells in the non-compressed state. In the case of pouch or rigid case cells (e.g., prismatic or cylindrical with metal cans), the pressure may reach such a point that a one-time use pressure release port or vent is opened. Once the pressure release port or vent is activated, the outside environment may sometimes contaminate the cell, limiting future use. A conventional method of mitigating gassing in pouch cells is to release gas formed during formation by opening the cell and resealing the cell. Formation is conventionally considered the first charge or charge/discharge cycle or cycles, and may include constant voltage steps or rest steps, or both.

SUMMARY

According to one or more embodiments, a method of producing a lithium-ion cell includes constructing a cell defining a cavity housing an electrode assembly including a cathode, an anode, a separator, and an electrolyte; forming the cell to generate formation gas in the cavity; and releasing the formation gas from the cavity. The method further includes placing a solid adsorbent in the cavity adjacent the electrode assembly after the releasing; and sealing the cavity with the solid adsorbent therein such that post-formation gas is adsorbed by the solid adsorbent in the cavity.

According to at least one embodiment, the solid adsorbent may be a molecular sieve, zeolite, metal-organic framework, or covalent organic framework. In certain embodiments, the solid adsorbent may be a 5 Å molecular sieve. In one or more embodiments, the releasing may include removing a portion of the cell such that the cavity has an opening. In further embodiments, the sealing may include sealing the opening. In at least one embodiment, the releasing may include removing a plug to open a fill hole, and the sealing may include inserting the plug to seal the fill hole. According to one or more embodiments, the post-formation gas may be hydrogen, methane, ethane, ethene, propene, carbon monoxide, carbon dioxide, or mixtures thereof. In certain embodiments, the cathode may include $LiNi_{0.8}Mn_{0.1}Co_{0.1}O_2$, the anode may include natural graphite, and the electrolyte may include lithium hexafluorophosphate dissolved in a mixture of ethylene carbonate, ethyl methyl carbonate and dimethyl carbonate. In some embodiments, the cell is a pouch cell formed of metallized plastic. In other embodiments, the cell is a prismatic cell having a metal can body.

According to one or more embodiments, a method includes constructing a cell defining a cavity housing an electrode assembly; forming the cell to generate formation gas in the cavity; and producing an opening to the cavity to release the formation gas. The method further includes placing a solid adsorbent in the cavity through the opening after the formation gas is released and sealing the opening with the solid adsorbent in the cavity such that post-formation gas is adsorbed by the solid adsorbent in the cavity during use and storage.

According to at least one embodiment, the cavity may be defined by a first portion of the cell housing the electrode assembly and a second portion of the cell adjacent the electrode assembly. In further embodiments, the producing may include removing the second portion to form the opening to the cavity. In at least one embodiment, the opening is a fill hole in the cell. In further embodiments, the producing may include removing a plug to open the fill hole, and the sealing may include inserting the plug to close the fill hole. In one or more embodiments, the post-formation gas may be hydrogen, methane, ethane, ethene, propene, carbon monoxide, carbon dioxide, or mixtures thereof. In at least one embodiment, the solid adsorbent may be a molecular sieve, zeolite, metal-organic framework, or covalent organic framework. In certain embodiments, the solid adsorbent may be a 5 Å molecular sieve.

According to one or more embodiments, a lithium-ion cell includes a body defining a cavity housing an electrode assembly including a cathode, an anode, and an electrolyte, and a solid adsorbent adjacent the electrode assembly. The solid adsorbent is selected to adsorb a post-formation gas, such that the post-formation gas generated in the cavity during storage or use is adsorbed by the solid adsorbent in the cavity. In at least one embodiment, the post-formation gas may be hydrogen, methane, ethane, ethene, propene, carbon monoxide, carbon dioxide, or mixtures thereof.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Internal gas generation in Li-ion cells can lead to performance degradation in both compressed and non-compressed cells. Opening of the cell may allow contaminants such as water and oxygen inside the cell causing the degradation in performance.

Gas may be generated within a lithium-ion cell via multiple mechanisms. Cells produce formation gas during formation of solid electrolyte interfaces between the electrodes and electrolyte. Cells continue to produce gas after formation, referred to here as post-formation gas. Post-formation gas is produced, for example, from continued reactions between the electrolyte and electrodes, reactions with impurities, overcharge, over-discharge and storage at high temperatures. Gas generation may be continuous throughout the life of the cell and may vary based on the state of charge.

Figure 1:
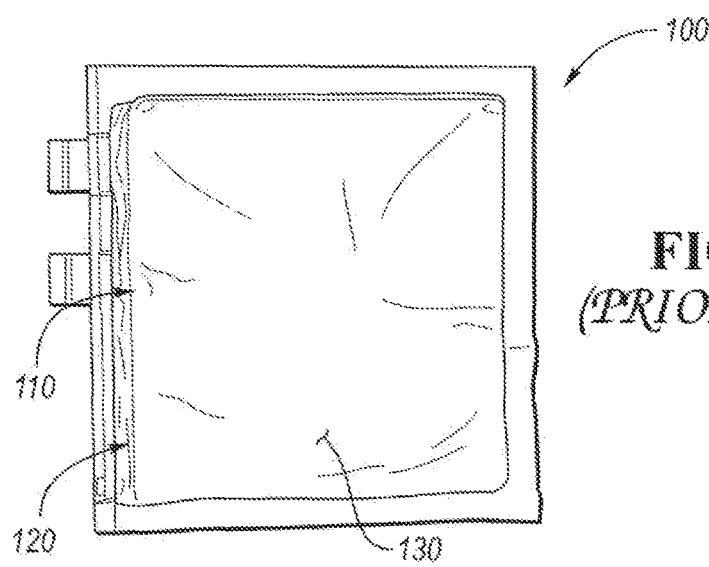
FIG. 1 is a perspective view of a conventional pouch cell.

As shown in FIG. 1, conventional pouch cell 100 includes a pocket or cavity 110 which includes the cathode, anode, separator, and electrolyte. In conventional pouch cell 100, a release pocket 120 is a portion of the pocket 110 and is a region of the cavity for receiving the formation gas generated in pocket 110. The release pocket 120 is typically cut off after formation gas causes swelling 130, and the conventional cell 100 is sealed around the electrodes. Pocket 110 and release pocket 120 are in gaseous communication such that formation gas can flow from pocket 110 to release pocket 120 and cause swelling 130. Multiple gases may be produced, depending on the electrode materials, electrolyte composition, impurities present, temperature, use and other factors. Pocket 110 is typically resealed at an edge portion after removal of the release pocket 120 (depicted as a portion of the pocket 110 between the electrode assembly and the release pocket 120), which forms a sealed edge portion, such that post-formation gases that form during use and storage become trapped in pocket 110 and cause pressure increases or swelling in the pocket 110. For Li-ion cells, common gases produced include, but are not limited to, carbon dioxide ($CO_2$), hydrogen ($H_2$), carbon monoxide (CO), methane ($CH_4$), ethene ($C_2H_4$), and ethane ($C_2H_6$). Other gases may be present that cause swelling or pressure increases in the cell.

According to one or more embodiments, cells with a solid adsorbent that mitigate risk of pressure increase when compared to conventional cells and methods to produce same are provided. The solid adsorbent adsorbs post-formation gases generated during use and storage of the cell.

Figure 2A:
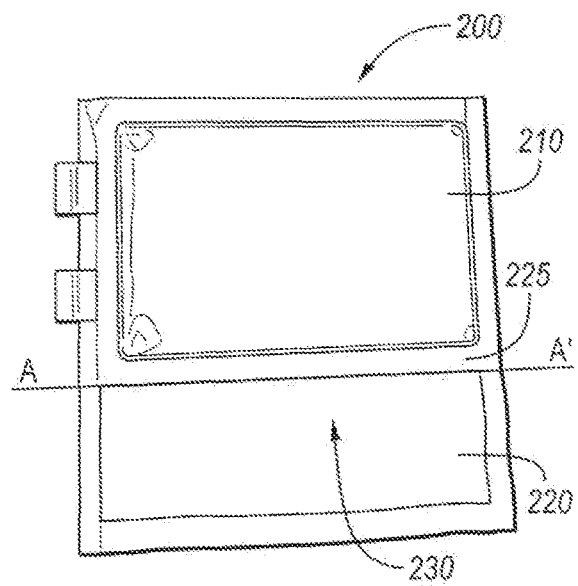
FIG. 2A is a perspective view of a pouch cell before formation gas is released, according to an embodiment.
Figure 2B:
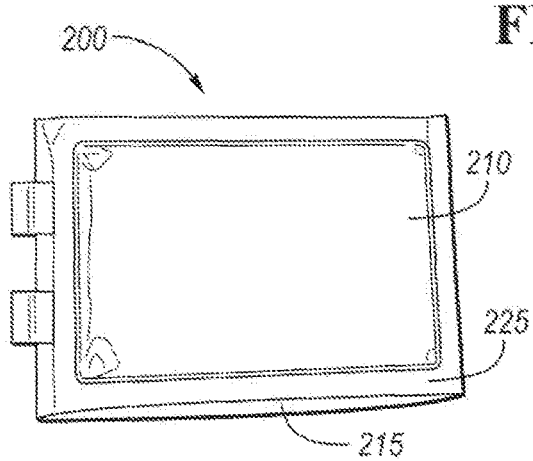
FIG. 2B is a perspective view of a pouch cell as formation gas is released, according to the embodiment of FIG. 2A.
Figure 2C:
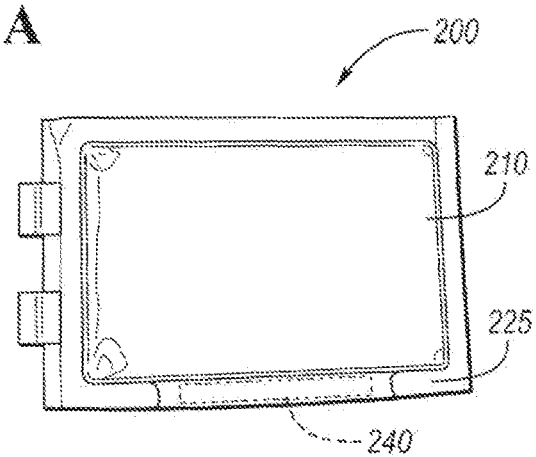
FIG. 2C is a perspective view of a pouch cell after resealing, according to the embodiment of FIG. 2A.

Referring to FIGS. 2A-C, a pouch cell 200 is shown according to an embodiment. Pouch cell 200 may be formed of a metallized plastic encapsulating an electrode assembly in the form of, in some embodiments, a stack. In other embodiments, the electrode assembly may be a wound or jelly roll assembly. Although a stacked electrode assembly is depicted in the Figures, other suitable configurations for the electrode assembly are contemplated. Pouch cell 200 includes a pocket 210 (or cavity 210) which houses the electrode assembly. The electrode assembly includes the cathode, anode, separator, and electrolyte. In the embodiment shown in FIG. 2, the cathode is a lithium nickel manganese cobalt oxide with the formula $LiNi_{0.8}Mn_{0.1}Co_{0.1}O_2$ (i.e., NMC 811). The anode is natural graphite, and the electrolyte is lithium hexafluorophosphate and additives, dissolved in a mixture of ethylene carbonate, ethyl methyl carbonate and dimethyl carbonate. Although the embodiment shown includes the foregoing materials where the pouch cell generates methane as the post-formation gas, other materials are contemplated such that any post-formation gas can be adsorbed by a selected solid adsorbent. For example, Li-ion battery anodes may be formed of carbonaceous materials, such as, but not limited to, graphite (natural, artificial, or surface-modified), hard carbon, soft carbon, or Si/Sn-enriched graphite. Non-carbonaceous anodes may also be used, such as, but not limited to, lithium titanium oxide, lithium and lithium alloys. Li-ion cathodes may include materials such as, but not limited to, lithium cobalt oxide (LCO), lithium nickel cobalt aluminum oxide (NCA), lithium nickel manganese cobalt oxide (NMC), lithium nickel manganese cobalt aluminum oxide (NCMA), lithium manganese oxide (Mn Spinel or LMO), lithium iron phosphate (LFP), lithium iron manganese phosphate (LFMP) and mixtures thereof. Li-ion cells generally include a solid, polymer or, most commonly, a liquid electrolyte. A liquid electrolyte may include a lithium salt and solvent, and may optionally include additives. Lithium salts may include, but are not limited to, $LiPF_6$, $LiN(SO_2F)_2$, $LiN(SO_2CF_3)_2$, $LiC(SO_2CF_3)_3$, $LiB(C_2O_4)_2$, $LiBF_4$ or $LiClO_4$ and mixtures thereof. Suitable organic solvents may include, for example, ethylene carbonate (EC), fluoroethylene carbonate (FEC), propylene carbonate, dimethyl carbonate (DMC), ethyl methyl carbonate (EMC), diethyl carbonate (DEC), or mixtures thereof. Li-ion battery separators may be formed of any suitable porous, electrically insulating material, for example, polyethylene, polypropylene, or a combination thereof).

Referring again to the embodiment of FIGS. 2A-C, pouch cell 200 includes a release pocket 220 (or cavity). In certain embodiments, as shown in FIG. 2A, release pocket 220 is a portion of pocket 210, adjacent the electrode assembly, such that the pocket 210 and release pocket 220 are portions of single sealed area of the pouch cell 200. Although release pocket 220 is shown below pocket 210, it may be located in any suitable position adjacent the pocket 210 as required by the construction of the pouch cell. Release pocket 220 is a portion of the pouch cell defining a cavity for receiving the formation gas generated in pocket 210 during formation. Formation is defined herein as the process of forming the interface layer between the electrode and electrolyte. Formation may be any suitable process, including, but not limited to, the following examples: putting the cell through initial cycling, i.e., the first charge or discharge cycle(s), charging/discharging the cell multiple times with optional rest steps and/or optionally holding voltage. Pocket 210 and release pocket 220 are in gaseous communication such that gas (such as methane) can flow from pocket 210 to release pocket 220. As in conventional cells, there are multiple gases that may be produced during formation, depending on the electrode materials, electrolyte composition, impurities present, and other factors.

As shown in FIG. 2A, the formation gas produced during formation is trapped at swollen region 230 at release pocket 220. As shown in FIG. 2A, release pocket 220 is cut off along line A-A' at an edge portion 225 of pouch cell 200 such that the formation gas is released. As shown in FIG. 2B, the cell 200 is open at edge portion 225 prior to the cell 200 being resealed. A solid adsorbent 240 is added into the pocket 210 via opening 215 at the edge portion 225 that was opened to release the formation gas. The solid adsorbent 240 is positioned adjacent the electrode assembly in the pocket 210, and the cell 200 is subsequently sealed with the solid adsorbent 240 therein. Although the solid adsorbent 240 is shown positioned at the bottom of the pouch cell 200 per the shown orientation, the solid adsorbent 240 may be place at any region of the pocket 210 through opening 215.

As shown in FIG. 2C, the adsorbent 240 is located within pocket 210, adjacent the electrodes, and is a solid capable of adsorbing hydrocarbons and/or other post-formation gases. The post-formation gas may be hydrogen, methane, ethane, ethene, propene, or mixtures thereof. In certain embodiments, the post-formation gas may include other gases, including but not limited to carbon dioxide, carbon monoxide, or combinations thereof. Other gases may also be generated and are collectively contemplated as post-formation gases. In some embodiments, the adsorbent 240 is selected such that it selectively adsorbs post-formation gas, such as, but not limited to, methane, ethane, and/or hydrogen. The solid adsorbent 240 in various embodiments may be a molecular sieve, zeolite, metal-organic framework, or covalent organic framework. In one or more embodiments, the solid adsorbent 240 may be a molecular sieve, powder, bead, or binder. The solid absorbent may be contained in any suitable container, such as a gas permeable, liquid electrolyte impermeable container. In some embodiments, the container may be a porous plastic tube or pouch. In certain embodiments, the solid absorbent may be aggregated with a binder such as poly(vinylidene fluoride-co-hexafluoropropylene). In the embodiment shown in FIG. 2C, the adsorbent 240 is a molecular sieve having a porosity of 5 Å (i.e., a 5 Å molecular sieve).

The solid adsorbent 240 is added to the pocket 210 of the cell 200 after the formation gas is released by opening the cell at release pocket 220. Opening of the cell may in some embodiments refer to removal of the release pocket 220 portion of the pocket 210. Release pocket 220 is opened or removed such that the formation gas generated (i.e., during formation) is released prior to placement of the adsorbent 240 in the pocket 210 via opening 215. The cell 200 is sealed at edge portion 225 prior to the normal cycling the cell with the solid adsorbent 240 within the pocket 210 alongside the electrode assembly. The solid adsorbent 240 in certain embodiments is isolated from the electrolyte such that it is not in contact with the electrolyte. However, the selection of the solid adsorbent 240 is based on the post-formation gas being adsorbed. The post-formation gas may be methane, ethane, hydrogen, or mixtures thereof. In certain embodiments, the post-formation gas may include other gases, including but not limited to carbon dioxide, carbon monoxide, ethene, propene, or combinations thereof. During storage or use (i.e., after the cell has undergone formation), post-formation gas that forms in pocket 210 is adsorbed by adsorbent 240, as shown in FIG. 2C, such that swelling is reduced in the pouch cell 200. By reducing the amount of post-formation gas present in the cell 200, cycle life can be improved such that the cell can endure more cycles over its life without significant loss in capacity.

Figure 3:
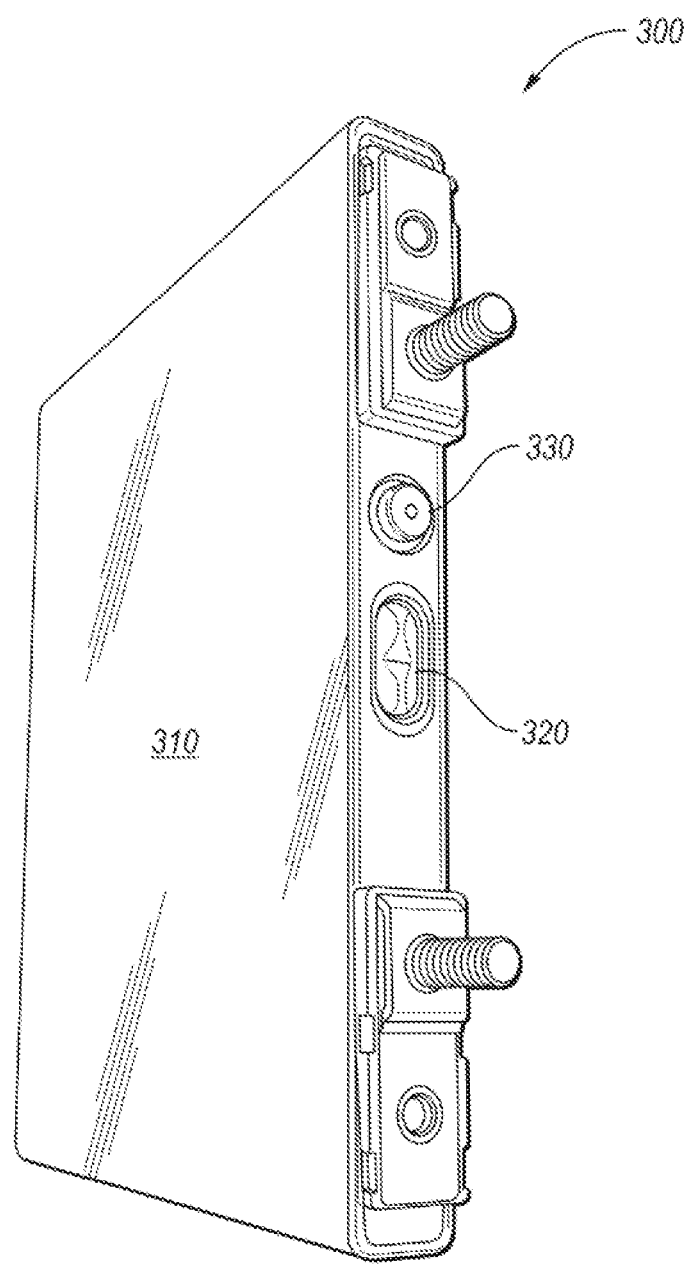
FIG. 3 is a perspective view of a prismatic cell, according to an embodiment.

Referring to FIG. 3, a prismatic cell 300 is shown according to an embodiment. Prismatic cell 300 includes a body 310 for housing the electrode assembly therein, as well as terminals. The body 310 may be any suitable metal. Cell 300 further includes a vent 320 for releasing pressure in the cell, and a plug 330 for sealing a corresponding fill hole. Plug 330 may be any suitable device for removably sealing the fill hole, including but not limited to, a stopper, threaded screw, or a rivet. After prismatic cell 300 is initially cycled, plug 330 is opened such that formation gas generated during formation is released thru the fill hole. Although plug 330 is shown, plug may be any suitable device removable from the fill hole in any suitable manner such that the fill hole is open or sealed, for example, by turning with a threaded plug, or pulling out and pushing in an interference fit plug or rivet. The solid adsorbent (not shown) can be inserted into the body 310 via the fill hole, which may be an electrolyte fill hole, and then resealed by plug 330. The solid adsorbent may be similar to those discussed above, such as, but not limited to a molecular sieve, powder, bead, or binder. In an embodiment, the molecular sieve is a 5 Å molecular sieve. The solid adsorbent in the body 310 can adsorb post-formation gases generated when the prismatic cell 300 undergoes cycling over its life such that swelling can be reduced and cycle life can be improved.

Figure 4:
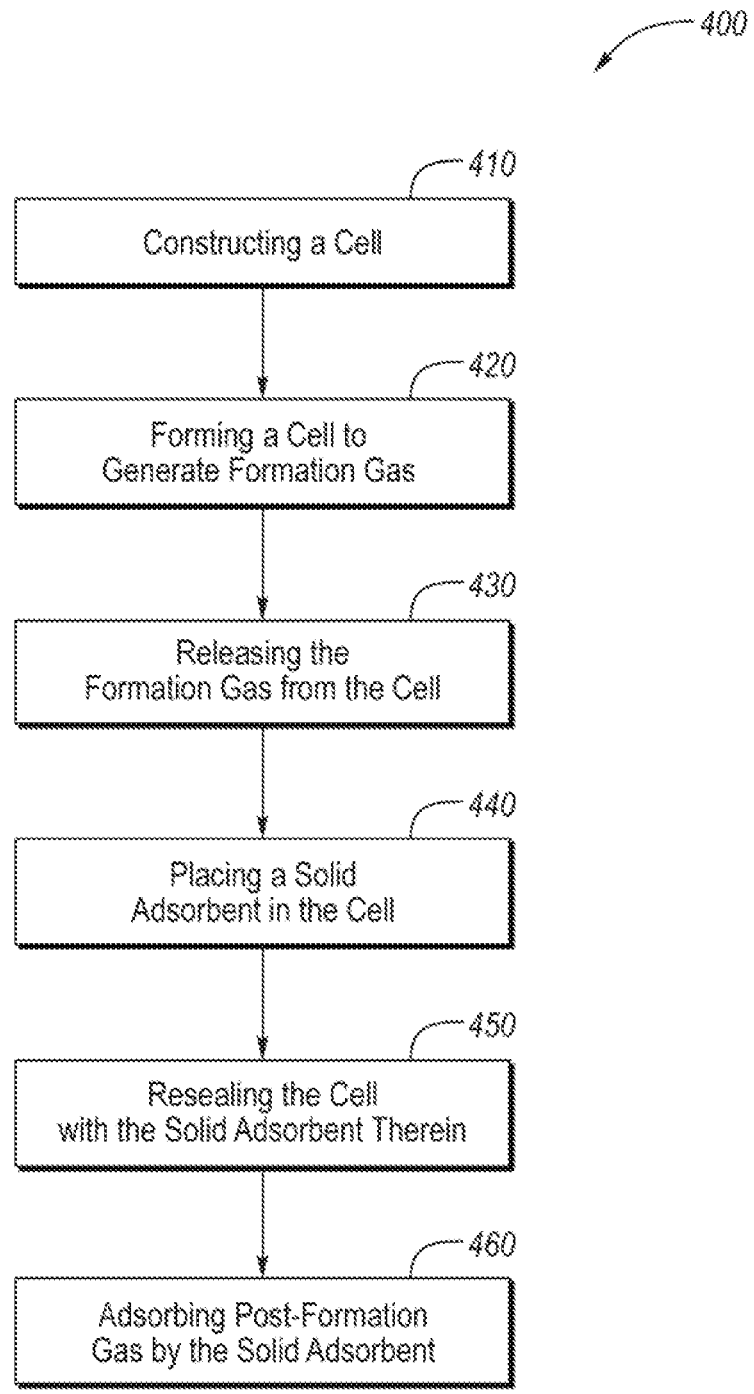
FIG. 4 is a flow chart of a method of forming a pouch cell, according to an embodiment.

With reference to FIG. 4, a method 400 of reducing swelling during cycling life, storage, and/or use of a battery is described according to an embodiment. Similar to above, the method 400 is described with reference to a lithium-ion battery and methane gas, however, one of ordinary skill in the art will understand, based on the present disclosure, that other gases (such as, but not limited to ethane and/or hydrogen) may be adsorbed, or that certain steps may be rearranged, modified, added, or removed, as necessary.

Step 410 includes constructing a pouch cell having a cavity housing an electrode assembly, the electrode assembly including a cathode, an anode, and an electrolyte. The cavity (or pocket) may define, in some embodiments, a release pocket portion in gaseous communication with the cavity adjacent to the electrode assembly. At step 420, the cell undergoes formation and generates formation gas in the cavity. In the embodiment with the release pocket, the formation gas may be stored in the release pocket space. Step 430 includes releasing the formation gas from the cavity. The formation gas may be released by forming an opening in the cavity. The formation gas may be released by opening a plug, as in the embodiment shown in FIG. 5, or by removing a portion of the cell with the release pocket as shown in FIGS. 2A-C. At step 440, a solid adsorbent is inserted in the cavity of the cell. The solid adsorbent is placed in the cavity via the opening formed during the releasing. At step 450, the cavity is resealed with the solid adsorbent therein. In the embodiment of a prismatic cell, the adsorbent is placed through the fill hole, which is then resealed, e.g. by inserting the plug. At step 460, post-formation gas formed in the cavity over life of the cell (i.e., after formation during storage and use and) is collected by the solid adsorbent.

EXPERIMENTAL RESULTS

Example 1

Figure 5:
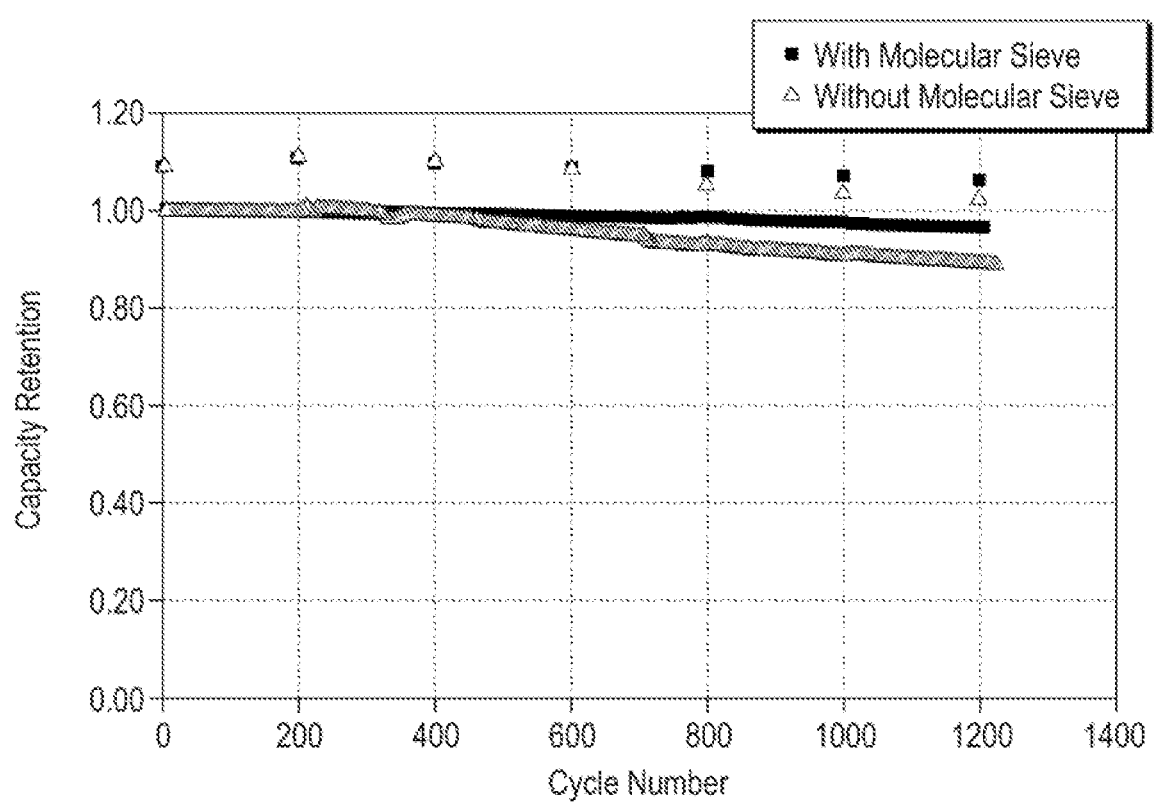
FIG. 5 is a graph showing capacity retention over cycle life for conventional pouch cells and a pouch cell according to an embodiment.

Two lithium-ion pouch cells were constructed. The cathode was 94 weight percent lithium nickel manganese cobalt oxide ($LiNi_{0.8}Mn_{0.1}Co_{0.1}O_2$, NMC 811), 3 weight percent carbon black and 3 weight percent polyvinylidene difluoride binder. The anode was 95% weight percent natural graphite, 2.5 weight percent sodium carboxymethyl cellulose binder and 2.5 weight percent styrene-butadiene rubber binder. The separator was a 20 micron thick porous polyolefin membrane. The cathode current collector was aluminum foil. The anode current collector was copper foil. The liquid electrolyte included lithium hexafluorophosphate and additives dissolved in ethylene carbonate, ethyl methyl carbonate and dimethyl carbonate. The areas of the cells including the electrodes were placed under compression between two parallel plates 5 mm apart. Both cells were filled with electrolyte, rested for 12 hours and then underwent formation that consisted of a C/10 rate charge to 3.7 V. After formation, both cells were opened releasing the formation gas. In one cell, 1.09 g 5 Å molecular sieve 8×12 mesh, beaded was added. Both cells were then resealed. Both cells were cycled with discharges at 1 C rate to 3.0 V (with periodic lower rate discharges), and charges at 1 C rate to 4.2 V, followed by constant voltage at 4.2 V until the current decreased to 0.2 C rate. Referring to FIG. 5, cycle life is shown for conventional pouch cell (as shown in FIG. 1) and pouch cell of this Example. After around 1200 cycles the capacity retention for the cell containing 5 Å molecular sieve was higher than the cell without the sieve, as shown in FIG. 5. Post-formation gas caused swelling in the cell without molecular sieves. The cell including the molecular sieve was not swollen; indicating that the post-formation gas was adsorbed by the 5 Å molecular sieves. Thus, as shown by this Example, the pouch cell with the molecular sieve adsorbs post-formation gas during cycling, and the molecular sieve does not harm cycle life.

According to one or more embodiments, a cell is provided with a solid adsorbent therein (such as a molecular sieve) for adsorbing post-formation gas. The adsorbent is added in the cell already having undergone formation such that the formation gas has already been released by removal of a release pocket or by venting. The adsorbent is configured to selectively adsorb post-formation gas over the cycle life and during storage and use of the cell. Post-formation gas generated in the pocket is adsorbed by the adsorbent such that swelling of the pouch cell can be reduced.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of producing a lithium-ion cell comprising:
   constructing a cell having a first portion and a second portion cooperating to define a sealed cavity with a seal at a first location corresponding to an edge of the second portion,
   the sealed cavity housing an electrode assembly including a cathode, an anode, a separator, and an electrolyte;
   forming the cell to generate formation gas in the sealed cavity;
   detaching the second portion of the cell, including the seal, from the first portion to unseal the sealed cavity to release the formation gas from the sealed cavity to form an open cavity defined in the first portion;
   placing a solid adsorbent in the open cavity adjacent the electrode assembly after the detaching; and
   sealing the open cavity at a second location, different from the first location, corresponding to an edge of the first portion with the solid adsorbent therein to form a resealed cavity such that post-formation gas is adsorbed by the solid adsorbent in the resealed cavity.

2. The method of claim 1, wherein the cell is a pouch cell formed of metallized plastic.

3. The method of claim 1, wherein the solid adsorbent is a molecular sieve, zeolite, metal-organic framework, or covalent organic framework.

4. The method of claim 1, wherein the solid adsorbent is a 5 Å molecular sieve.

5. The method of claim 1, wherein the post-formation gas is formed in the resealed cavity during cell operation.

6. The method of claim 1, wherein the post-formation gas is hydrogen, methane, ethane, ethene, propene, carbon monoxide, carbon dioxide, or mixtures thereof.

7. The method of claim 1, wherein the cathode includes $LiNi_{0.8}Mn_{0.1}Co_{0.1}O_2$, the anode includes natural graphite, and the electrolyte includes lithium hexafluorophosphate dissolved in a mixture of ethylene carbonate, ethyl methyl carbonate and dimethyl carbonate.

8. A method comprising:
   constructing a cell having a first portion and a second portion cooperating to define a cavity housing an electrode assembly;
   sealing the cavity at a first location corresponding to an edge of the second portion to form a sealed cavity;
   forming the cell to generate formation gas in the sealed cavity;
   detaching the second portion of the cell including the first location such that the sealed cavity is opened to form an open cavity in the first portion defining an opening at an edge of the first portion and release the formation gas from the open cavity;
   placing a solid adsorbent in the open cavity through the opening after the formation gas is released; and
   sealing the open cavity at a second location, different from the first location, corresponding to the edge of the first portion to form a resealed cavity with the solid adsorbent in the resealed cavity such that post-formation gas is adsorbed by the solid adsorbent in the cavity during use and storage.

9. The method of claim 8, wherein the solid adsorbent is a molecular sieve, zeolite, metal-organic framework, or covalent organic framework.

10. The method of claim 8, wherein the solid adsorbent is a 5 Å molecular sieve.

11. The method of claim 8, wherein the post-formation gas is hydrogen, methane, ethane, ethene, propene, carbon monoxide, carbon dioxide, or mixtures thereof.

12. The method of claim 8, wherein the cavity is defined by the first portion of the cell housing the electrode assembly and the second portion of the cell adjacent the electrode assembly.

* * * * *